United States Patent
Lee et al.

(10) Patent No.: US 8,644,597 B2
(45) Date of Patent: *Feb. 4, 2014

(54) SYSTEM AND METHOD FOR GENERATING AND REGENERATING 3D IMAGE FILES BASED ON 2D IMAGE MEDIA STANDARDS

(71) Applicant: Samsung Electronics Co., Ltd., Gyeonggi-do (KR)

(72) Inventors: Gun-Ill Lee, Seoul (KR); Kwang-Cheol Choi, Gyeonggi-do (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,753

(22) Filed: Jun. 4, 2013

(65) Prior Publication Data

US 2013/0286159 A1 Oct. 31, 2013

Related U.S. Application Data

(63) Continuation of application No. 12/136,507, filed on Jun. 10, 2008, now Pat. No. 8,457,386.

(30) Foreign Application Priority Data

Jun. 11, 2007 (KR) ........................ 10-2007-0056475

(51) Int. Cl.
G06K 9/00 (2006.01)
G06K 9/36 (2006.01)
H04N 5/917 (2006.01)
G06F 15/16 (2006.01)

(52) U.S. Cl.
USPC ............ 382/154; 382/232; 386/329; 709/230

(58) Field of Classification Search
None
See application file for complete search history.

(56) References Cited

U.S. PATENT DOCUMENTS 4,630,097 A 12/1986 Marks
5,596,421 A 1/1997 Shibata et al.
(Continued)

FOREIGN PATENT DOCUMENTS

JP 6350968 12/1994
JP 07030925 1/1995
(Continued)

OTHER PUBLICATIONS

Information Technology—Coding of Audio-Visual Objects—Part 12: ISO base media file format, ISO/I EC 14496-12 (2nd Edition, 2005).*

(Continued)

*Primary Examiner* — Bhavesh M Mehta
*Assistant Examiner* — David F Dunphy
(74) *Attorney, Agent, or Firm* — The Farrell Law Firm, P.C.

(57) ABSTRACT

Methods and apparatus are provided for generating 3D image files based on 2D image media standards. First and second image data are photographed, pre-processed, and stored. The first and second image data are encoded. A 3D image file is generated. The 3D image file includes a first area having the first and second image data synchronized with the first image data so as to be used for generating a 3D image, a second area including at least information on a number of frames and a size of each frame for the first image data, and a third area, separate from the second area, having information on a number of frames and a size of each frame for the second image data. Information stored in third area is for regenerating the 3D image and not for regenerating a 2D image.

22 Claims, 5 Drawing Sheets

(56) References Cited

U.S. PATENT DOCUMENTS

| | | | |
|---|---|---|---|
| 5,923,869 | A | 7/1999 | Kashiwagi et al. |
| 7,257,226 | B1 | 8/2007 | Honma |
| 2006/0051057 | A1 | 3/2006 | Nakagawa |
| 2010/0171812 | A1 | 7/2010 | Kim et al. |
| 2010/0231689 | A1* | 9/2010 | Bruls et al. ............ 348/43 |

FOREIGN PATENT DOCUMENTS

| | | |
|---|---|---|
| JP | 11191895 | 7/1999 |
| JP | 2001-126407 | 5/2001 |
| JP | 2003111101 | 4/2003 |
| JP | 2005026800 | 1/2005 |
| JP | 2006-074531 | 3/2006 |
| JP | 2010530160 | 9/2010 |
| KR | 1020050056070 | 6/2005 |
| KR | 100716142 | 5/2007 |

OTHER PUBLICATIONS

Information Technology—Coding of Audio-Visual Objects Part 12: ISO base media file format, ISO/IEC 14496-12 (2nd Edition, 2005).

* cited by examiner

SYSTEM AND METHOD FOR GENERATING AND REGENERATING 3D IMAGE FILES BASED ON 2D IMAGE MEDIA STANDARDS

PRIORITY

This application is a continuation application of U.S. patent application Ser. No. 12/136,507, filed in the U.S. Patent and Trademark Office on Jun. 10, 2008, and which issued as U.S. Pat. No. 8,457,386 on Jun. 4, 2013, which claims priority to an application entitled "System and Method For Generating and Regenerating 3D Image Files Based on 2D Image Media Standards" filed in the Korean Industrial Property Office on Jun. 11, 2007 and assigned Serial No. 2007-56475, the contents of which are incorporated herein by reference.

BACKGROUND OF THE INVENTION

1. Field of the Invention

The present invention relates to a system and a method for generating and regenerating a three-dimensional (3D) image file based on two-dimensional (2D) image media standards.

2. Description of the Related Art

Standardization of iMPEG-2, MPEG-4, MPEG-7, and MPEG-21 is in progress based on the Moving Picture Experts Group (MPEG), which is an international standardization organization regarding multimedia. As various standards have been developed, there has been a growing need for establishing one profile by combining different standard technologies. An example of an activity that has responded to this need is the MPEG-Application (MPEG-A: ISO/ICE 230000) multimedia application standardization.

Various Multimedia Application Formats (MAFs) have been developed as activities of the MPEG-A, in order to combine non-MPEG standards with typical MPEG standards so that the value of activity of a standard is higher. As such, without an effort to establish new separate standards, it is possible to establish a multimedia application format in such a manner that standard technologies, which have been previously verified, are combined with each other, and the effective value of the multimedia application format can be maximized. Currently, standardization of technologies such as Digital Audio Broadcasting MAF (DAB MAF) and Digital Multimedia Broadcasting MAF (DMB MAF) is in progress. However, standardization regarding a file format for storing 3D images is not in progress.

The latest image technology for implementing 3D images includes a technology for regenerating 3D images in only a portable terminal having a barrier Liquid Crystal Display (LCD) mounted therein. However, there are no known technologies for generating 3D images in typical portable terminals or a 3D image storing format for regeneration of 3D images.

SUMMARY OF THE INVENTION

Accordingly, the present invention has been made to solve the above-mentioned problems occurring in the prior art, and provides a system and a method for regenerating a 3D image in a typical portable terminal.

The present invention provides a three-dimensional file format for generating and regenerating a 3D image.

Also, the present invention provides a three-dimensional file format formed in such a manner that a part of a 2D image file format prescribed in International Standardization Organization (ISO) 14496-12 is changed according to a standardization regarding the multimedia application format of Motion Picture Experts Group (MPEG)-A.

The present invention achieves generation and regeneration of a 2D image file and a 3D image file by such a 3D file format.

Meanwhile, the present invention provides a system and method for generating and regenerating such a 3D image file.

In accordance with the present invention, a portable terminal is provided for generating 3D image files based on 2D image media standards. The portable terminal includes one or more cameras configured to photograph a first image data and a second image data. The portable terminal also includes an image signal processing unit configured to pre-process the first image data and the second image data. Additionally, the portable terminal includes a storing unit configured to store the first image data and the second image data, and an encoding unit configured to encode the first image data and the second image data. The portable terminal further includes a file generating unit configured to generate a 3D image file. The 3D image file includes a first area having the first image data and the second image data synchronized with the first image data so as to be used for generating a 3D image, a second area having at least information on a number of frames and a size of each frame for the first image data, and a third area, separate from the second area, having information on a number of frames and a size of each frame for the second image data. Information stored in third area is for regenerating the 3D image and not for regenerating a 2D image.

In accordance with the present invention, a portable terminal is provided for regenerating 3D image files based on 2D image media standards. The portable terminal includes a file parsing unit configured to receive a three-dimensional image file including a first image data, a second image data, second area and a third area and parse at least one of information of the first image data and information of the second image data. The portable terminal also includes a storing unit configured to store parsed data, and a decoding unit configured to decode the first image data and the second image data. The portable terminal further includes a regenerating unit configured to synthesize and regenerate at least one of the first image data and the second image data into a 3D image file. The regenerating unit refers to information stored in the second area and information stored in the third area to regenerate the 3D image, and refers information stored in the second area and does not refer the information stored in third area to regenerate the 2D image.

In accordance with the present invention, a method is provided for generating 3D image files based on 2D image media standards. First image data and second image data are photographed. The first image data and the second image data are pre-processed. The first image data and the second image data are stored. The first image data and the second image data are encoded. A 3D image file is generated. The 3D image file includes a first area having the first image data and the second image data synchronized with the first image data so as to be used for generating a 3D image, a second area having at least information on a number of frames and a size of each frame for the first image data, and a third area, separate from the second area, having information on a number of frames and a size of each frame for the second image data. Information stored in third area is for regenerating the 3D image and not for regenerating a 2D image.

In according with the present invention, a method is provided for regenerating 3D image files based on 2D image media standards. A three-dimensional image file including first image data, second image data, second area and third area is received. At least one of information of the first image data and information of the second image data is parsed. The parsed data is stored. The first image data and the second image data are decoded. At least one of the first image data and the second image data is synthesized and regenerated into a 3D image file. The regenerating refers to information stored in the second area and information stored in the third area to regenerate the 3D image, and refers information stored in the second area and does not refer the information stored in third area to regenerate the 2D image.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, preferred embodiments of the present invention will be described with reference to the accompanying drawings. In the following description, the same elements will be designated by the same reference numerals although they are shown in different drawings. Further, a detailed description of known functions and configurations incorporated herein will be omitted for the sake of clarity and conciseness.

Figure 1:
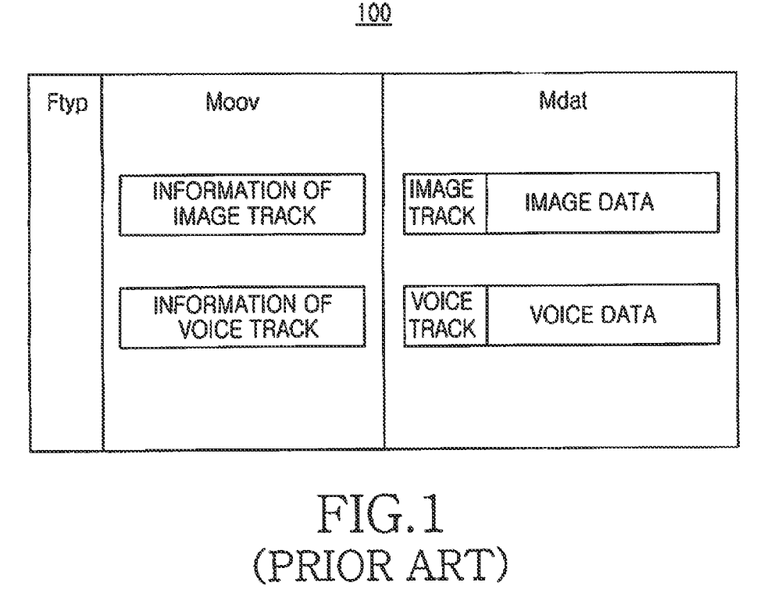
FIG. 1 illustrates a conventional 2D image file storing format.

FIG. 1 illustrates a 2D image file storing format according to the conventional ISO 14496-12. The 2D image file storing format 100 includes a Moov box (Moov) area and an Media Data Box (Mdat) area. Herein, the Mdat area is a data area of the file format and includes actual image data and voice data in each track. The image data and the voice data are stored in each track with a frame module.

The Moov area corresponds to a header area of the file format and has a structure based on an object. The Moov area includes all pieces of information for regenerating files regarding contents information including a frame rate, a bit rate, the size of an image, and synchronization information for supporting a function for regenerating commands such as fast forward (FF) and rewind (REW). Particularly, information regarding the number of all frames of image data or voice data and the size of each frame, is included so that image data and voice data can be restored and regenerated in such a manner that the moov area is parsed during regeneration.

Figure 2A:
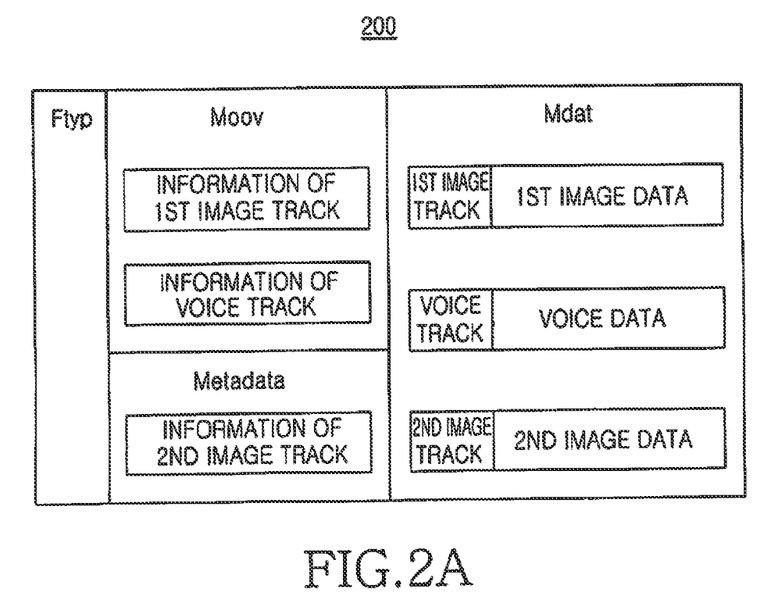
FIG. 2a illustrates a first 3D image file storing format according to the present invention.

FIG. 2a illustrates a first 3D image file storing format according to the present invention. A 2D image file storing format 200 is formed in such a manner that only a metadata area is added to the 2D image file format shown in FIG. 1. Therefore, a structure and a function of the 2D image file format can be used without substantial alteration thereto. The Mdat area includes a voice track, a first image track and a second image track. The first image track includes first image data, and the second image track includes second image data.

Herein, the first image data and the second image data are data formed by using the sense of sight of a human being, and are image data formed by photographing an image of the left sight point and an image of the right sight point by using the first camera and the second camera respective to a subject. As such, each separate image is generated and regenerated at the left and right eyes of the user so that the user feels a cubic effect. If one of the first image data and the second image data is regenerated, the user enjoys a 2D image, and if the first image data and the second image data are combined with each other to be regenerated, the user can enjoy a 3D image.

The Moov area as a header area includes information regarding the first image track and information regarding the voice track, and the metadata area includes information regarding the second image track. Such track information includes information regarding the number of all frames of each piece of data and the sizes of the frames, so that when a three-dimensional image is regenerated, each piece of data can be combined in such a manner that such information is analyzed.

Figure 2B:
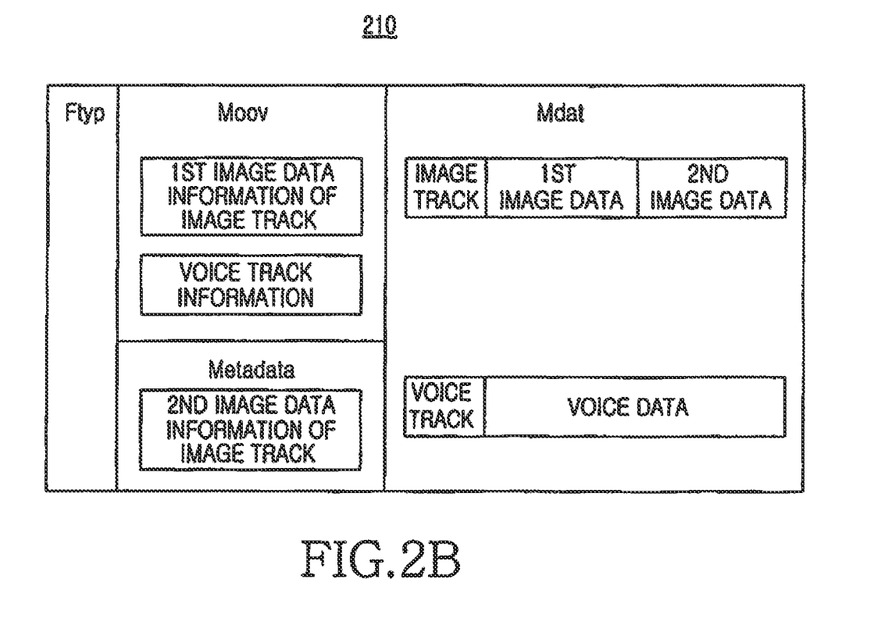
FIG. 2b illustrates a second 3D image file storing format according to the present invention.

FIG. 2b illustrates a second 3D image file storing format according to the present invention. The 3D image file storing format 210 includes an Mdat area as a data area, a Moov area as a header area, and a metadata area. However, in comparison with the first 3D image file storing format 200, there is one image track instead of two image tracks, and the first and second image data are included in the one image track.

According to a storing method of 3D image file storing format 210, one of the first and the second image data is first stored, and then the remaining image data is stored. Therefore, it is possible to construct image data in only one track.

The Moov area has the number of all frames of the first image data, the sizes of the frames, and information regarding a starting address of the image track, at which the first image data has been stored. The metadata area has the number of all frames of the second image data, the sizes of the frames, and information regarding a starting address, in which the second image data has been stored, of the image track. As such, it is possible to synthesize and regenerate the first and the second image data into a 3D image.

Figure 2C:
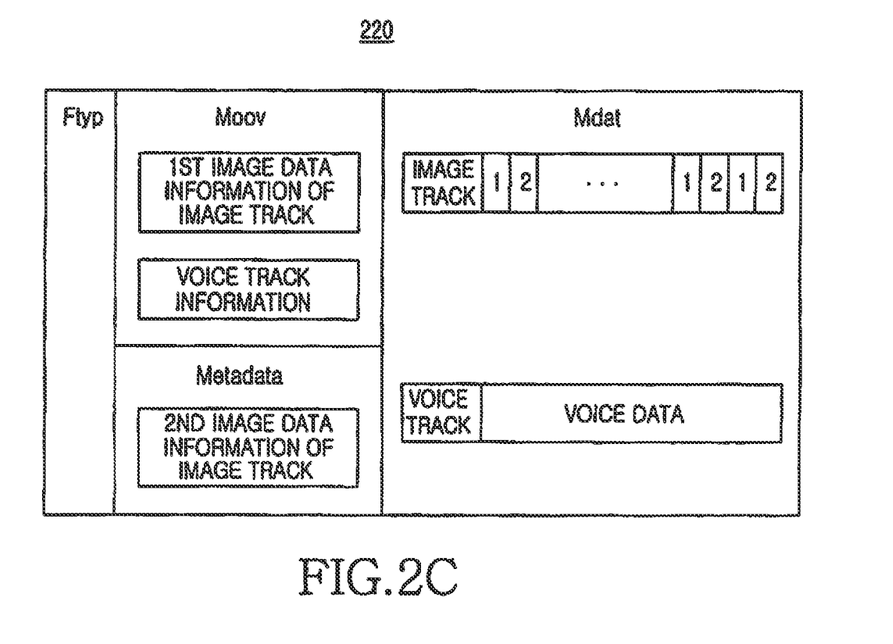
FIG. 2c illustrates a third 3D image file storing format according to the present invention.

FIG. 2c illustrates a third 3D image file storing format according to the present invention. The 3D image file storing format 220 also includes an Mdat area as a data area, a Moov area as a header area, and a metadata area. However, although the 3D image file storing format 220 also includes one image track, similar to the 3D image file storing format 210, the first and the second image data are alternatively stored in the one image track in comparison with the 3D image file storing format 210. Therefore, the Moov area as the header area includes the number of all frames of the first image data, the sizes of the frames and offset information until the next first image data is arranged after a first image data, as well as information regarding a starting address of the image track, at which the first image data has been stored.

The metadata area also includes the number of all frames of the second image data, the sizes of the frames, and offset information until the next second image data is arranged after a second image data, as well as information regarding a starting address of the image track, at which the second image data has been stored.

Figure 3:
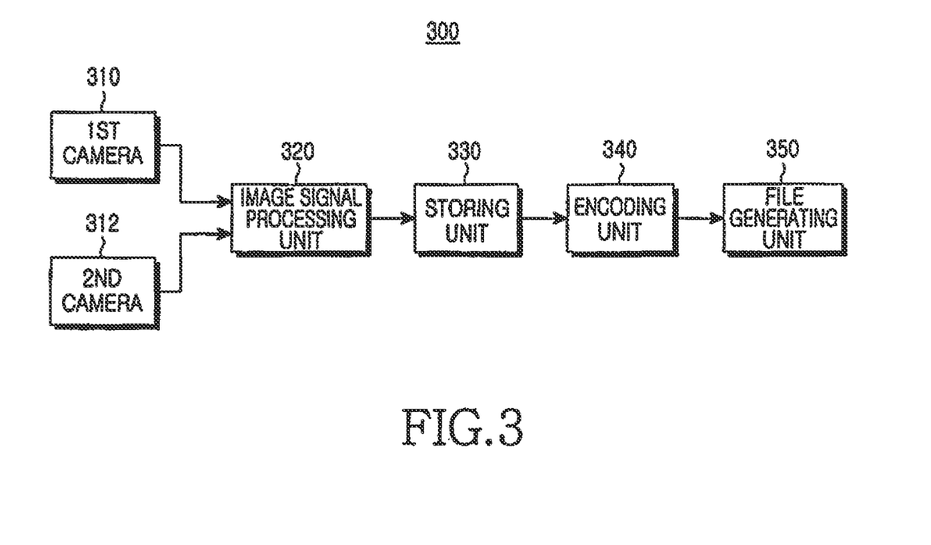
FIG. 3 illustrates a 3D image file generating device according to the present invention.

FIG. 3 illustrates a 3D image file generating device according to the present invention. The 3D image file generating unit 300 includes a first camera 310, a second camera 312, an image signal processing unit 320, a storing unit 330, an encoding unit 340 and a file generating unit 350.

The first camera 301 photographs an image of a left sight point or an image of a right sight point respective to a subject so as to output a first image data. The second camera 320 photographs an image of another sight point, which is different from the sight point of the first camera 301, respective to the subject, so as to output second image data.

The first and the second image data, which are output from the first camera 301 and the second camera 320, undergo a pre-process through the image signal processing unit 320. The pre-process operation is to convert an analog value of an outer image value, i.e. elements of light and colors, which have been recognized through a sensor in a Charge Coupled Device (CCD) type or a Complementary Metal-Oxide Semiconductor (CMOS) type, to a digital value.

The storing unit 330 stores the first and the second image data which have undergone a pre-process through the image signal processing unit 320. Also, the encoding unit 340 encodes the stored first image data and the stored second image data. The encoding operation of the encoding unit 340 relates to data compression, and can be omitted if needed.

The file generating unit 350 generates a three-dimensional file by using the first and the second image data, which have been encoded in the encoding unit 340. At this time, the first and the second image data are stored in the data area, information for parsing the first image data is stored in the header area, and information for parsing the second image data is stored in the metadata area.

Figure 4:
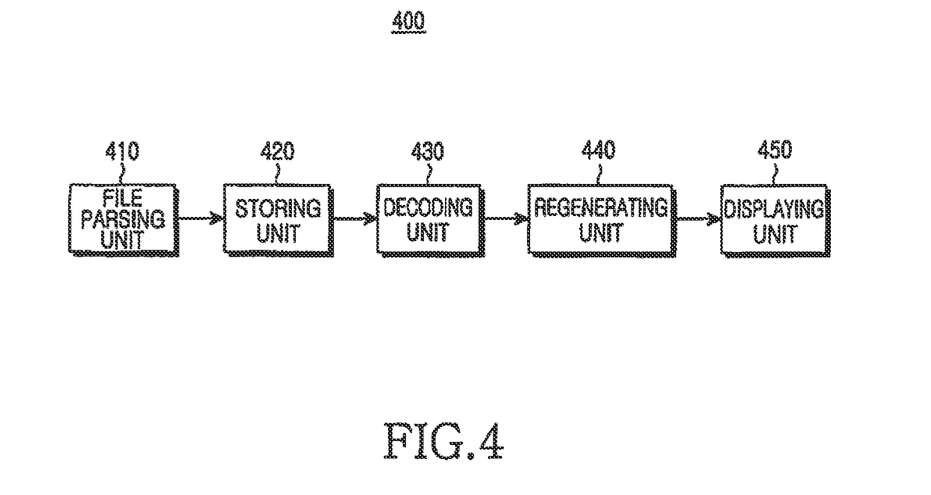
FIG. 4 illustrates a 3D image file regenerating device according to the present invention.

FIG. 4 illustrates a 3D image file regenerating device according to the present invention. In FIG. 4, the 3D image file regenerating unit 400 includes a file parsing unit 410, a storing unit 420, a decoding unit 430, a regenerating unit 440 and a display unit 450.

The file parsing unit 410 receives a three-dimensional image file generated in the file generating unit 350 of the 3D image file generating device 300 so as to use it in parsing the 3D image file. At this time, the information of the first and the second image data, which are stored in the header area and the metadata area, respectively, is parsed, and then the stored first and second image data are extracted. Then, they are stored in the storing unit 420.

The decoding unit 430 decodes the first and second image data, which are stored in the storing unit 420. This operation is performed when the first and second image data have been encoded by the encoding unit 340 in the 3D image file generating unit 300.

The regenerating unit 325 synthesizes the first image data and the second image data, which have been decoded, into a three-dimensional image so as to regenerate them. At this time, track information stored in the header area and the metadata area of the 3D image file is used for the synthesis. Herein, when the regenerating unit 440 does not refer to the information of the second image data, which is stored in the metadata area, only first image data is regenerated, so that a typical 2D image is regenerated.

Also, although a typical regenerating device, which can not regenerate a 3D image, receives a 3D image file, it is enough to refer only a Moov area according to a conventional standard, and not the metadata area, so that it is possible to regenerate a 2D image. As such, the 3D image file storing format according to the present invention has compatibility respective to regeneration of a conventional 2D image and a 3D image. The display unit 450 displays a three-dimensional image, which is synthesized and regenerated in the regenerating unit 440.

Figure 5:
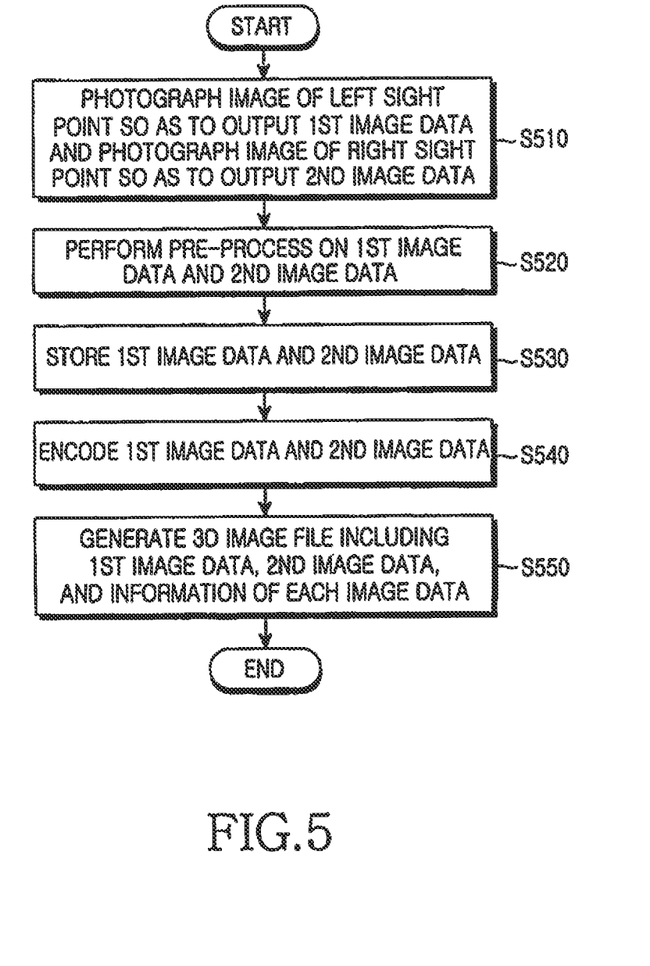
FIG. 5 illustrates a method for generating a 3D image file according to the present invention.

FIG. 5 illustrates a method for generating a 3D image file according to the present invention. In FIG. 5, the 3D image file generating method includes a photographing step S510, a pre-processing step S520, a storing step S530 and an encoding step S540, and a file generating step S550.

In the photographing step S510, one of an image of a left sight point and an image of a right sight point respective to a subject is photographed so as to output the first image data. An image of the remaining sight point is photographed so as to output the second image data.

In the pre-processing step S520, a pre-processing is performed on the first image data and the second image data so that the first and the second image data, which are recognized through a CCD sensor or a CMOS sensor, are converted from analog values to digital values.

In the storing step S530, the first and second image data, which have undergone the pre-processing in step S520, are stored in the storing unit 330. Also, the first image data and the second image data, which have been stored in the storing unit 330, are compressed in the encoding step S540. The encoding step S540 can be omitted, if desired.

In the file generating step S550, a 3D image file is generated by using the first and the second image data, which have been encoded in the encoding unit 340. At this time, the first and the second image data are stored in the data area, information for parsing the first image data is stored in the header area, and information for parsing the second image data is stored in the metadata area.

Figure 6:
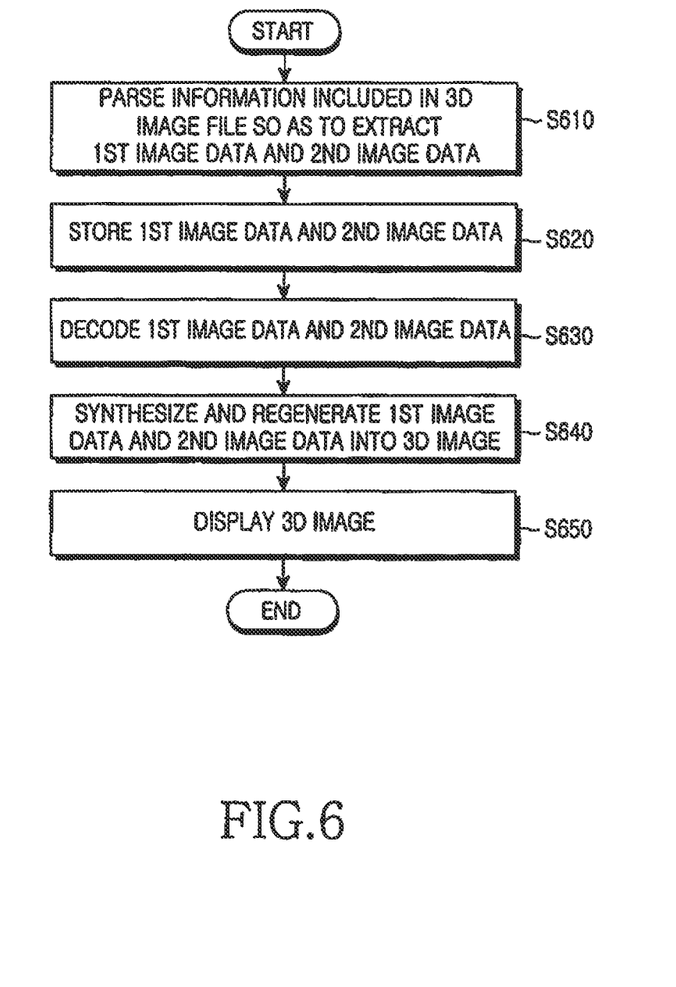
FIG. 6 illustrates a method for regenerating a 3D image file according to the present invention.

FIG. 6 illustrates a method for regenerating a 3D image file according to the present invention. In FIG. 6, the 3D image file regenerating method includes an image extracting step S610, a storing step S620, a decoding step S630, a regeneration step S640 and a displaying step S650. The method of FIG. 6 is for regenerating the 3D image file generated in FIG. 5.

In the image extracting step S610, information of the first image data, which is stored in the header area of the 3D image file, and information of the second image data, which is stored in the metadata area, are parsed so that the first image data and the second image data are extracted.

The first image data and the second image data, which have been extracted in the image extracting step S610, are stored in the storing unit 420 in the storing step S620. Then, the first image data and the second image data, which have been stored in the storing unit 420, are decoded in the decoding step S630. When the encoding step S540 is omitted in the method for generating a 3D image file, the decoding step S630 is also omitted.

In the regeneration step S640, the first and the second image data, which have been decoded in the decoding step S630, are synthesized as a three-dimensional image so as to be regenerated. If the second image data isn't included in the data area of the 3D image file, or the generating unit 440 does not refer to information of the second image data stored in the metadata area of the 3D image file, a typical 2D image is regenerated instead of a 3D image. Therefore, it is possible to select a 2D image or a 3D image according to the user's choice and regenerate it.

Also, although a typical regenerating device, which does not support regeneration of a 3D image, receives a 3D image file, it is possible to regenerate it as a 2D image. In the display step S650, the 3D image file, which is synthesized and regenerated in the regeneration step S640, is displayed on the displaying unit 450. It is also possible to achieve regeneration on a typical Liquid Crystal Display (LCD) as such a displaying unit.

According to the present invention, a verification process as a new standard can be simplified by using a standard technique, which has been already verified, in a regulation of a 3D image file format. There is also an advantage in that one of a 2D image file or a 3D image file is selected so as to be generated or regenerated by the new 3D image file format.

What is claimed is:

1. A portable terminal for generating three-dimensional (3D) image files based on two-dimensional (2D) image media standards, the portable terminal comprising:
   one or more cameras configured to photograph first image data and second image data;
   an image signal processing unit configured to pre-process the first image data and the second image data;
   a storing unit configured to store the first image data and the second image data;
   an encoding unit configured to encode the first image data and the second image data; and
   a file generating unit configured to generate a 3D image file, wherein the 3D image file comprises a first area having the first image data and the second image data synchronized with the first image data so as to be used for generating a 3D image, a second area comprising at least information on a number of frames and a size of each frame for the first image data, and a third area, separate from the second area, comprising information on a number of frames and a size of each frame for the second image data,
   wherein information stored in third area is for regenerating the 3D image and not for regenerating a 2D image.

2. The portable terminal of claim 1, wherein the first area further comprises a first image track including the first image data and a second image track including the second image data.

3. The portable terminal of claim 1, wherein the first area further comprises an image track in which the first image data is first stored and then the second image data is stored.

4. The portable terminal of claim 3, wherein the information of the first image data or the information of the second image data comprises a number of frames, a size of each frame, and a starting address of the first image data or the second image data.

5. The portable terminal of claim 1, wherein the first area comprises an image track in which the first image data and the second image data are alternatively stored while the first area has a module of frames.

6. The portable terminal of claim 5, wherein the information of the first image data or the information of the second image data comprises a number of frames, a size of each frame, a starting address, and off-set information regarding the alternatively stored frames of the first image data or the second image data.

7. The portable terminal of claim 1, wherein the one or more cameras comprises a first camera for photographing an image of a left sight point respective to a subject so as to output the first image data and a second camera for photographing an image of a right sight point respective to the subject so as to output the second image data.

8. The portable terminal of claim 1, wherein the 3D image file format comprises a first area and a second area of a 2D image file format, and the third area comprising information regarding image data used for generating the three-dimensional image.

9. A portable terminal for regenerating three-dimensional (3D) image files based on two-dimensional (2D) image media standards, the portable terminal comprising:
   a file parsing unit configured to receive a three-dimensional image file comprising first image data, second image data, a second area and a third area and parse at least one of information of the first image data and information of the second image data;
   a storing unit configured to store the parsed data;
   a decoding unit configured to decode the first image data and the second image data; and
   a regenerating unit configured to synthesize and regenerate at least one of the first image data and the second image data into a 3D image file,
   wherein the regenerating unit refers to information stored in the second area and information stored in the third area to regenerate the 3D image, and refers information stored in the second area and does not refer the information stored in third area to regenerate the 2D image.

10. The portable terminal of claim 9, wherein the file parsing unit parses only information of the first image data so that the first image data is regenerated.

11. The portable terminal of claim 9, wherein the file parsing unit parses information of the first image data and information of the second image data so as to extract the first image data and the second image data;
   wherein the storing unit stores the extracted first image data and the extracted second image data;
   wherein the decoding unit decodes the stored first image data and the stored second image data;
   wherein the regenerating unit synthesizes and regenerates a 3D image by using the decoded first image data and the decoded second image data; and
   further comprising a display unit that displays the 3D image, which has been synthesized and regenerated.

12. A method for generating three-dimensional (3D) image files based on two-dimensional (2D) image media standards, the method comprising the steps of:
   photographing first image data and second image data;
   pre-processing the first image data and the second image data;
   storing the first image data and the second image data;
   encoding the first image data and the second image data; and
   generating a 3D image file, wherein the 3D image file comprises a first area having the first image data and the second image data synchronized with the first image data so as to be used for generating a 3D image, a second area comprising at least information on a number of frames and a size of each frame for the first image data, and a third area, separate from the second area, comprising information on a number of frames and a size of each frame for the second image data,
   wherein information stored in third area is for regenerating the 3D image and not for regenerating a 2D image.

13. The method of claim 12, wherein the first area further comprises a first image track including the first image data and a second image track including the second image data.

14. The method of claim 12, wherein the first area further comprises an image track in which the first image data is first stored and then the second image data is stored.

15. The method of claim 14, wherein the information of the first image data or the information of the second image data comprises a number of frames, a size of each frame, and a starting address of the first image data or the second image data.

16. The method of claim 12, wherein the first area comprises an image track in which the first image data and the second image data are alternatively stored while the first area has a module of frames.

17. The method of claim 16, wherein the information of the first image data or the information of the second image data comprises a number of frames, a size of each frame, a starting address, and off-set information regarding the alternatively stored frames of the first image data or the second image data.

18. The method of claim 12, wherein the 3D image file format comprises a first area and a second area of a 2D image file format, and the third area comprising information regarding image data used for generating the three-dimensional image.

19. A method for regenerating three-dimensional (3D) image files based on two-dimensional (2D) image media standards, the method comprising the steps of:
- receiving a three-dimensional image file comprising first image data, second image data, a second area and a third area;
- parsing at least one of information of the first image data and information of the second image data;
- storing parsed data;
- decoding the first image data and the second image data; and synthesizing and regenerating at least one of the first image data and the second image data into a 3D image file, wherein the regenerating refers to information stored in the second area and information stored in the third area to regenerate the 3D image, and refers information stored in the second area and does not refer the information stored in third area to regenerate the 2D image.

20. The method of claim 19, wherein the parsing parses only information of the first image data so that the first image data is regenerated.

21. The method of claim 19, wherein the parsing parses information of the first image data and information of the second image data so as to extract the first image data and the second image data;
- wherein the storing stores the extracted first image data and the extracted second image data;
- wherein the decoding decodes the stored first image data and the stored second image data; and
- wherein the regenerating synthesizes and regenerates a 3D image by using the decoded first image data and the decoded second image data.

22. The method of claim 21, further comprising displaying the 3D image, which has been synthesized and regenerated.

* * * * *